(12) United States Patent
Anthony et al.

(10) Patent No.: US 7,244,084 B2
(45) Date of Patent: Jul. 17, 2007

(54) SUPPORT SYSTEM FOR A CYLINDRICAL OBJECT

(75) Inventors: Reid C. Anthony, 11 Rosemont St., Albany, NY (US) 12203; Joseph A. Bliss, Hinckley, OH (US)

(73) Assignee: Reid C. Anthony, Albany, NY (US)

( * ) Notice: Subject to any disclaimer, the term of this patent is extended or adjusted under 35 U.S.C. 154(b) by 0 days.

(21) Appl. No.: 10/875,263

(22) Filed: Jun. 24, 2004

(65) Prior Publication Data

US 2005/0286985 A1    Dec. 29, 2005

(51) Int. Cl.
*B60P 7/08*    (2006.01)

(52) U.S. Cl. .............................. 410/49; 410/36; 410/47

(58) Field of Classification Search ................ 410/30, 410/36, 42, 47, 49, 50; 248/146, 671; 206/389, 206/446; 211/85.18, 85.22; 108/57.13, 108/55.3; 105/362; 188/3, 4 R, 32
See application file for complete search history.

(56) References Cited

U.S. PATENT DOCUMENTS

| | | | |
|---|---|---|---|
| 1,732,829 A | | 10/1929 | Boardman |
| 1,846,750 A | * | 2/1932 | Patterson ..................... 410/8 |
| 2,851,235 A | * | 9/1958 | Henig ......................... 410/44 |
| 2,870,982 A | | 1/1959 | Greene et al. |
| D210,188 S | | 2/1968 | Bums |
| D210,566 S | | 3/1968 | Jay |
| 3,650,501 A | | 3/1972 | Streb |
| 3,664,466 A | * | 5/1972 | Rotheiser |
| 4,375,860 A | | 3/1983 | Greaves, Jr. |
| 4,382,733 A | | 5/1983 | Rodgers |
| 4,442,991 A | | 4/1984 | Levens |
| 4,555,083 A | | 11/1985 | Carter |
| 4,932,621 A | | 6/1990 | Kowk |
| D329,963 S | | 10/1992 | Schneider |
| 5,346,165 A | * | 9/1994 | Frean et al. |
| D353,770 S | | 12/1994 | Prince |
| 5,441,220 A | | 8/1995 | Carlson |
| 5,549,339 A | | 8/1996 | Frean |
| 5,799,849 A | | 9/1998 | Beer et al. |
| 5,806,892 A | | 9/1998 | Colburn |
| 6,302,291 B1 | | 10/2001 | McCleerey |
| 2003/0205656 A1 | | 11/2003 | Updegrove |

\* cited by examiner

*Primary Examiner*—Stephen Gordon
(74) *Attorney, Agent, or Firm*—Hoffman, Warnick & D'Alessandro LLC

(57) ABSTRACT

A system for supporting a cylindrical object such as a storage tank using a plurality of supports. Each support may be a foot, having a curved portion adjacent to the cylindrical object and a base section. The feet may be mounted with their curved portions adjacent to the sides of the tank and the base section may be attached to a flexible base, which may be rolled or folded for easy storage when not in use. Furthermore, the support may be a portion of the base itself, folded toward the cylindrical object or folded as a flap from the center region toward the outer edge. The independent nature of the supports and their adjustability with respect to the base makes them suitable for use with tanks of various sizes. The independent nature of the supports also makes them suitable for use on uneven ground.

3 Claims, 9 Drawing Sheets

SUPPORT SYSTEM FOR A CYLINDRICAL OBJECT

BACKGROUND OF THE INVENTION

1. Technical Field

The present invention relates generally to supports for cylindrical objects and more particularly to structures for supporting cylindrical objects with their axes oriented in a roughly horizontal aspect.

2. Related Art

Cylindrical objects are frequently used to store and transport materials. These objects, which include storage tanks, barrels, casks, drums, etc., are particularly suited for storing liquids and pressurized gases. Scuba tanks and propane tanks are examples of storage tanks used to store compressed gas and transport it to where it is needed.

One of the challenges inherent in the use of a cylindrical object lies in the difficulty in securing it during storage or transportation. It is often advantageous to store or transport a cylindrical object on its side, i.e., with its axis in a roughly horizontal direction. However, due to its cylindrical nature the object may tend to roll in this configuration if not properly secured. The movement of the tank may cause it to collide with other objects, causing damage to the tank itself or to the object that it hits. This is especially true when a cylindrical object is transported by motor vehicle because frequent changes in speed and direction may precipitate or intensify rolling. Additionally, the contents of the cylindrical object are often pressurized and sometimes combustible and damage to the tank due to collision may cause an explosion or other potentially dangerous situations. For the above reasons, it is necessary that cylindrical objects be secured during transport and storage.

A number of systems for securing a cylindrical object have been developed in the past, but none adequately addresses the problem. Each of the following patents are hereby incorporated by reference. One example is found in U.S. Pat. No. 4,555,083 issued on Nov. 26, 1985 to Carter for an invention entitled "Scuba Tank Positioner," which describes a ring-shaped band attached to a flat plate that is fixedly mounted to a fixed structure. While this positioner will secure a cylindrical object, it has several disadvantages. First, although the positioner is adjustable, the adjustment is described as "slight," meaning that the positioner will only hold containers of a limited range of sizes. Second, the base member must be fixedly mounted, meaning that if the tank is moved from place to place, a base member must be mounted in each place. This permanently mounted base member takes up space even when the tank positioner is not being used in that location. Additionally, there are places where one may not want or be able to permanently mount the base member, and thus the positioner could not be used in these locations. Third, because the base member is in one piece it may not serve to secure the tank on uneven ground. Thus the "Scuba Tank Positioner" is limited in its usefulness.

U.S. Pat. No. 4,382,733 issued on May 10, 1983 to Rodgers for "Freight Cradle with Replaceable Deformable Cushioning Insert" describes another apparatus for securing an object during transport. This cradle includes two or more parallel bearers each having two upright arms defining a U-shaped groove to receive a cushioning pad and longitudinal members connecting the parallel bearers. Although this cradle can carry an object, it also has several drawbacks. Even though the cradle may be disassembled, the parallel bearers and the longitudinal members are large and difficult to store. Additionally, the parallel bearers are not adjustable, limiting the size of objects that may be held. Furthermore, although the cradle does not have to be permanently mounted, its one-piece design may limit its use on uneven surfaces. These drawbacks limit the usefulness of the "Freight Cradle with Replaceable Deformable Cushioning Insert."

U.S. Pat. No. 4,442,991 issued on Apr. 17, 1984 to Levens for "Cradle for Stowing Cylindrical Tank" describes another apparatus for use with a cylindrical object. The cradle comprises a pair of upstanding yokes connected by a central I-beam for holding a cylindrical tank. However, this cradle also has its limitations. First, the cradle has limited adjustment capability, making it useless for cylindrical objects outside a narrow range of size. Second, the cradle is relatively large and may be difficult to store. Finally, the cradle apparatus is in one piece, making it unusable on uneven surfaces.

These prior devices suffer from a number of drawbacks, namely they are not portable, are not adjustable, are difficult to store, or will not function correctly on uneven ground. In view of the foregoing, a new support system is needed in the art that addresses the problems of the related art.

SUMMARY OF THE INVENTION

What is proposed is a system for supporting a cylindrical object such as a storage tank using a plurality of supports. Each support may be a foot, having a curved portion adjacent to the cylindrical object and a base section. The feet may be mounted with their curved portions adjacent to the sides of the tank and the base section may be attached to a flexible base, which may be rolled or folded for easy storage when not in use. On the other hand, the support may be a portion of the base itself, folded toward the cylindrical object or folded as a flap from the center region toward the outer edge. The independent nature of the supports and their adjustability with respect to the base makes them suitable for use with tanks of various sizes. The independent nature of the supports also makes them suitable for use on uneven ground.

In a first aspect, the invention is provided a support system for supporting a cylindrical object defined about a longitudinal axis, the support system comprising: at least one pair of unconnected opposed feet, each foot having: a first side curved to conform to a curved exterior of the cylindrical object; a foot base; and an adhesive for coupling the first side of the foot to the cylindrical object, wherein the feet of each foot pair are rotationally spaced from each other about the longitudinal axis of the cylindrical object.

In a second aspect of the invention is provided a support system for supporting a cylindrical object with its longitudinal axis extending in a generally horizontal direction, the support system comprising: a flexible base member; and a plurality of opposed feet, each foot having: a first side curved to conform to a curved exterior of the cylindrical object; and a foot base coupled to the base member; wherein the first side of at least one foot abuts each side of a vertical plane containing the longitudinal axis of the cylindrical object.

In a third aspect of the invention is provided a support system for supporting a cylindrical object with its longitudinal axis extending in a generally horizontal direction, the support system comprising: a flexible base member having: a first and second surface; a first edge; and a second edge opposing the first edge; and at least one coupling member, wherein a section of the base member near the first edge may be folded in such a way as to couple the first surface of the flexible base member to the second surface of the base member using the at least one coupling member to form a support.

In a fourth aspect of the invention is provided a support system for supporting a cylindrical object with its longitudinal axis extending in a generally horizontal direction, the support system comprising: a flexible base member having: a first flap; and a second flap opposing the first flap, wherein each flap can be folded from a central region of the base member toward an outside edge to create opposing supports.

BRIEF DESCRIPTION OF THE DRAWINGS

The embodiments of this invention will be described in detail, with reference to the following figures, wherein like designations denote like elements, and wherein.

DETAILED DESCRIPTION OF THE INVENTION

Figure 1:
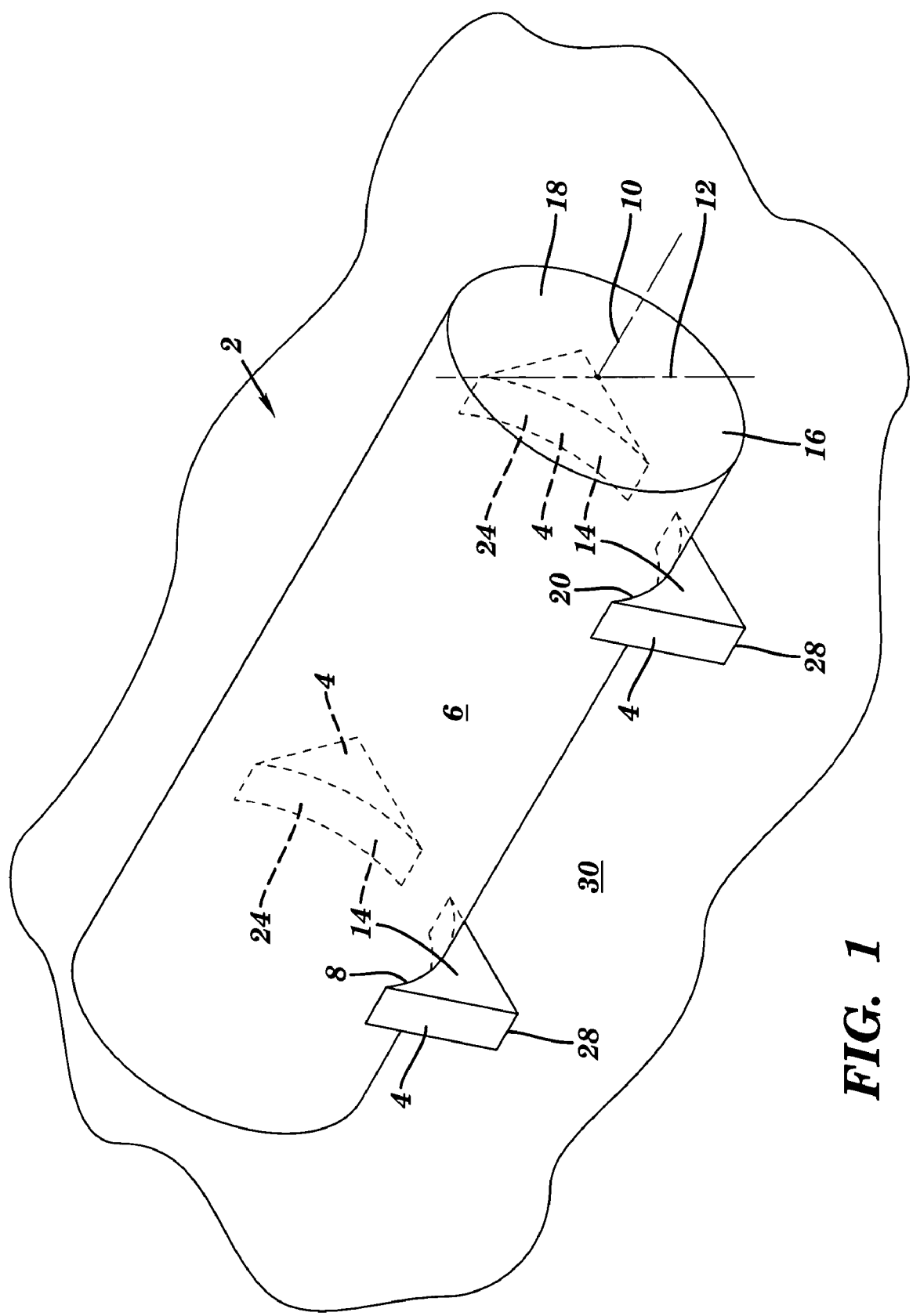
FIG. 1 shows a partial cross sectional view of several feet coupled to a cylindrical object.

With reference to the accompanying drawings, FIG. 1 is a partial cross sectional view of a support system 2 including a plurality of feet 4 coupled to a cylindrical object 6. Cylindrical object 6 may comprise a scuba tank, propane tank, pressurized gas tank, or any other right cylindrical, oblique cylindrical or roughly cylindrical object now known or later developed in the art. Feet 4 may be coupled to cylindrical object 6 with an adhesive 8. Adhesive 8 may comprise glue, tape, weld, magnet, VELCRO™, or any other adhesive now known or later developed in the art. Support system 2 supports cylindrical object 6 in a generally horizontal orientation relative to axis 10. Feet 4 are separate and unconnected from each other with at least one foot 4 being positioned on first and second opposing sides 16, 18 of a vertical plane 12 passing through axis 10 of cylindrical object 6. Feet 4 may be arranged as opposing pairs 14, as illustrated, with feet 4 of each foot pair 14 being rotationally spaced from each other about axis 10 of cylindrical object 6. Alternatively, feet 4 may be arranged such that a greater number of feet 4 are located on first side 16 of cylindrical object 6 than second side 18. Although a total of four feet 4 are illustrated, those skilled in the art should recognize that the actual number of feet 4 may be greater or fewer. Feet 4 may also be staggered such that a foot on first side 16 of cylindrical object 6 may not be directly opposed to a foot on second side 18.

Figure 2:
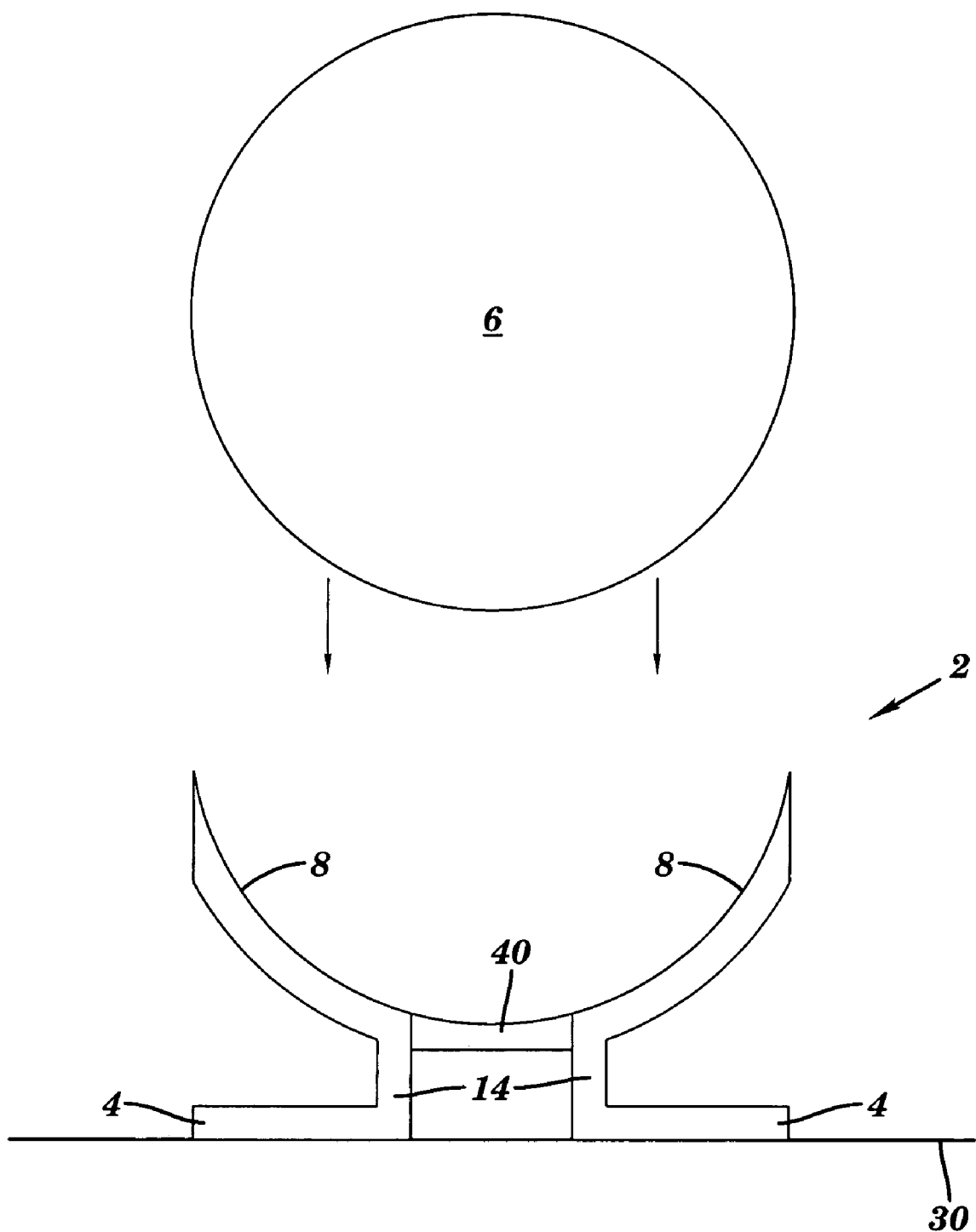
FIG. 2 shows a perspective view of feet coupled to a cylindrical object using a spacing system.

As illustrated in FIG. 2, support system 2 may also include a spacing system 40 for correctly spacing feet 4 with respect to cylindrical object 6 so that feet 4 contact both cylindrical object 6 and surface 30. Spacing system 40 is temporary and may be removed after feet 4 are coupled with cylindrical object 6 with adhesive 8. Spacing system 40 may comprise, for example, a spacer for separating each foot 4 in foot pair 14, a template, which may be temporarily or permanently affixed to cylindrical object 6 or placed under feet 4, or any other system for spacing now known or later developed in the art.

Figure 3:
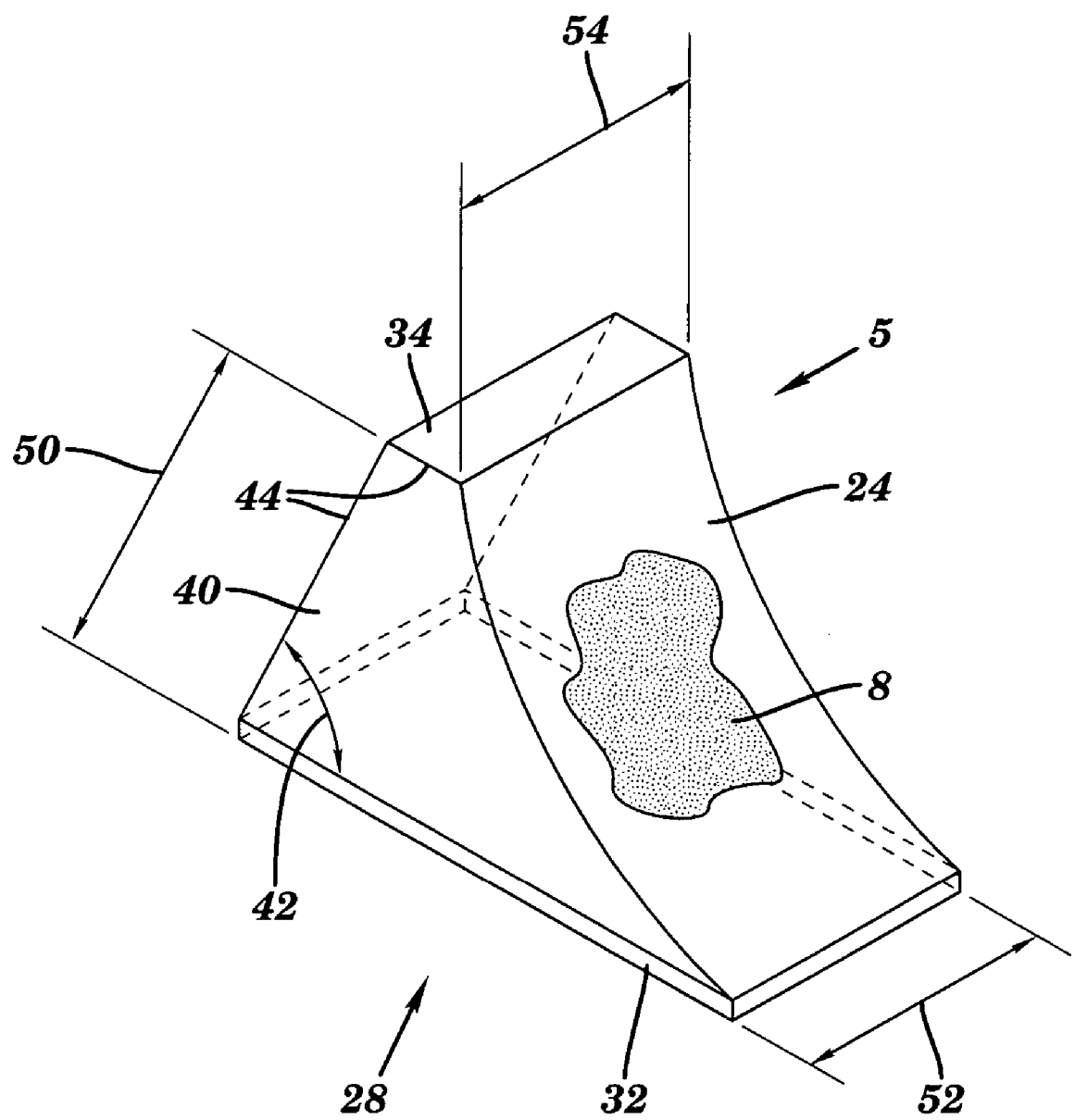
FIG. 3 shows a perspective view of one embodiment of a foot.
Figure 4:
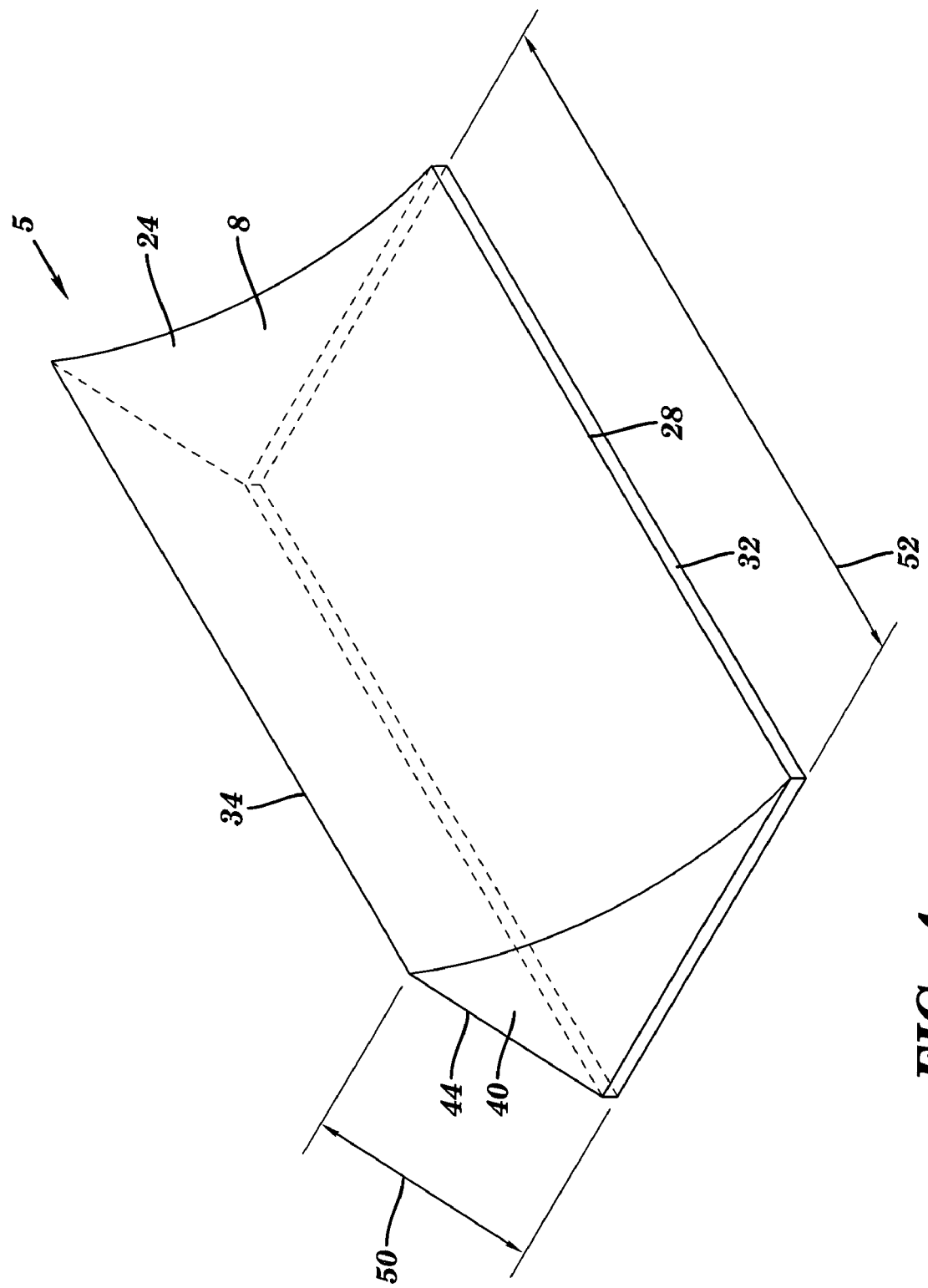
FIG. 4 shows a perspective view of one embodiment of a foot.

FIGS. 3–4 illustrate perspective views of different embodiments of a foot 5. Foot 5 has a curved side 24, which is curved to conform to a curved exterior 20 of cylindrical object 6, FIG. 1. As stated above, foot 5 may also have adhesive 8 for coupling curved side 24 of foot 5 to curved exterior 20 of cylindrical object 6. Foot 5 also has a base 28, which in one embodiment contacts a surface 30, as shown in FIG. 1, below cylindrical object 6 to prevent cylindrical object 6 from rotating. Base 28 may be planar as illustrated or may be have curves, grooves, indentations, protrusions, juts, or any other surface feature now known or later developed by those in the art. Foot 5 may also have coupled to base 28 of foot 5 a foot base pad 32, a portion of which may be made of a high friction substance to prevent foot 5 from slipping with respect to surface 30. A height 50 of foot 4 may be greater than a length 52 as shown in FIG. 3 or length 52 may be greater than height 50 as shown in FIG. 4. Furthermore, foot 5 may be greater or lesser in length 52 at base 28 than a length 54 at a top 34. Additionally, foot 5 may have a surface 40 adjacent to curved surface 24 and base 28, which may have three sides as shown in FIG. 1, four sides as shown in FIG. 3, or a greater number of sides as shown in FIG. 2. Furthermore, an edge 44 of surface 40 opposing curved surface 24 and base 28 may be curved or straight and may be roughly concave, as shown in FIG. 2, or convex so that surface 40 may have a surface area that is relatively large or small.

Figure 5:
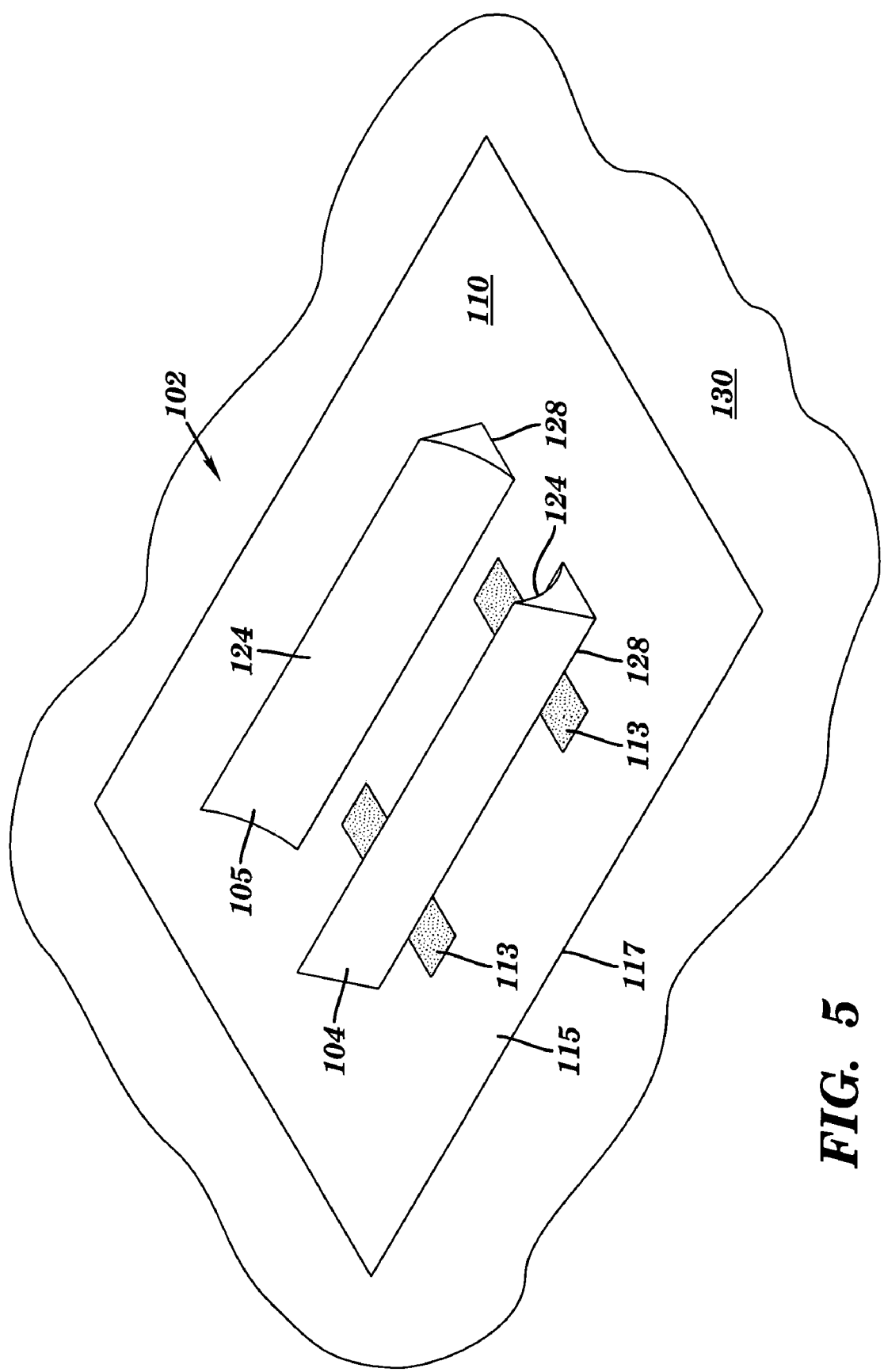
FIG. 5 shows an isometric view of a several feet and a base used in conjunction with a cylindrical object.

FIG. 5 shows an isometric view of a further embodiment of a support system 102. In this embodiment, support system 102 has a plurality of feet 104, 105 for supporting a cylindrical object (not shown). Each foot 104, 105 has a curved side 124 adjacent to the cylindrical object and a base 128 as described above. In this embodiment, base 128 of each foot 104, 105 is coupled to a flexible base member 110 upon which the cylindrical object rests so that curved side 124 of at least one foot 104 abuts the portion of the cylindrical object on each of the first and second sides the of vertical plane that contains the axis of the cylindrical object (See FIG. 1). Flexible base member 110 is illustrated as being rectangular in shape but may also be circular, ovoid, polygonal, asymmetrical, or any other shape. Flexible base member 110 may be flexible, allowing it to be folded or rolled for easy storage. Flexible base member 110 may also be elastic, letting it conform in size to cylindrical object 6 and allowing support system 102 to support the cylindrical object more securely. Flexible base member 110 may be made of rubber, cloth, animal skin, plastic, ceramic, metal, graphite, polymer, or any other material now known or later developed. Feet 104, 105 may be permanently mounted to flexible base member 110. Conversely, one or more foot adjusters 113 may be used to adjust at least one foot 104 with respect to flexible base member 110 to allow cylindrical objects of different sizes to be supported using support system 102. Foot adjuster 113 may comprise a slider latch, cam lock, strap, belt, screw, VELCRO™, grip or any other adjustable fastener now known or later developed. Flexible base member 110 may have a high friction component to all or a portion of one or all of its surfaces 115, 117 to prevent the cylindrical object from sliding with respect to support system 102 or to prevent support system 102 from sliding with respect to a surface 130 adjacent to surface 117 of flexible base member 110 opposite the cylindrical object. Additionally, all or a portion of curved side 124 of at least one foot 104, 105 may have a high friction component to prevent the cylindrical object from sliding with respect to foot 104, 105.

Figure 6:
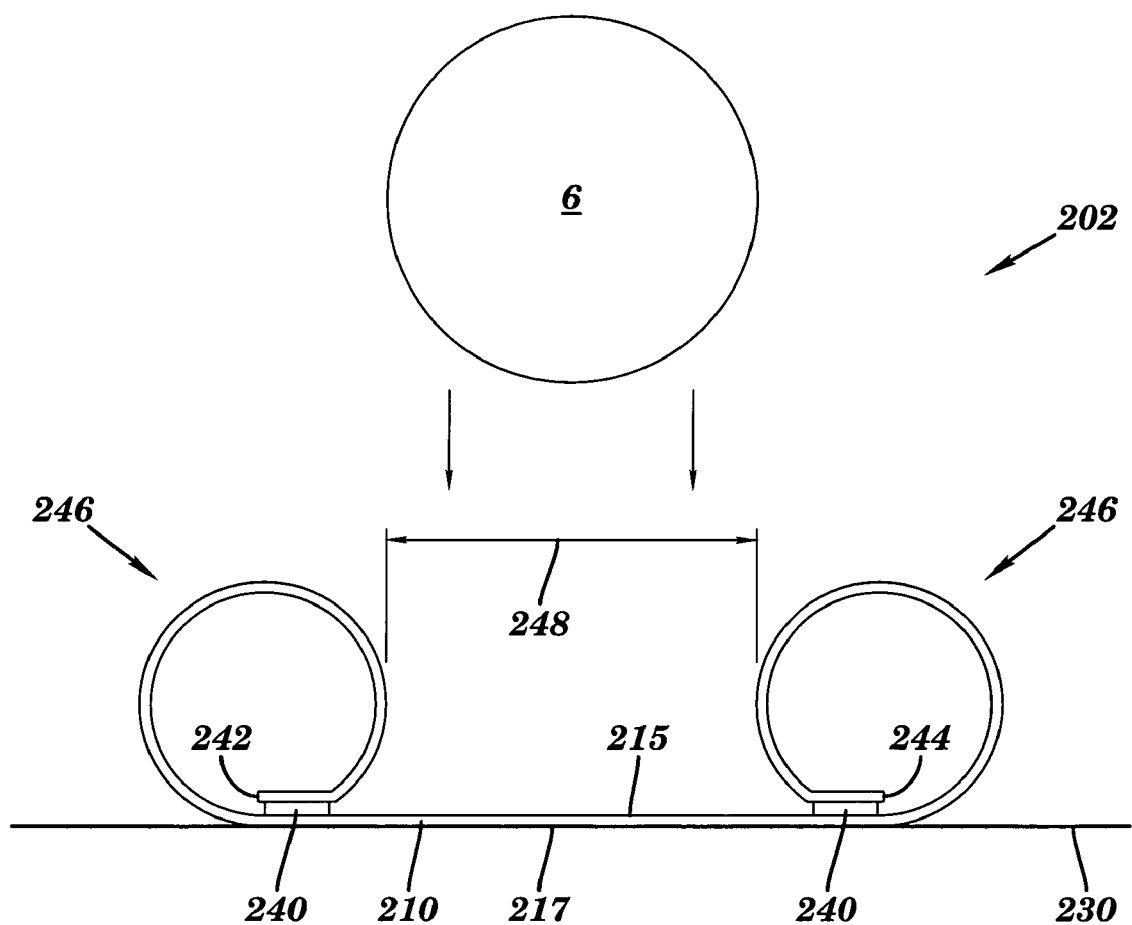
FIG. 6 shows a perspective view of a base coupled to itself to form supports for a cylindrical object.

FIG. 6 shows a perspective view of another embodiment of a support system 202. In this embodiment, support system 202 has a flexible base member 210 and at least one coupling member 240. Flexible base member 210 has a first surface 215, a second surface 217, a first edge 242, and a second edge 244 that opposes first edge 242. Flexible base member 210 may be rectangular, circular, ovoid, polygonal, asymmetrical, or any other shape. Flexible base member 210 may be made of rubber, cloth, animal skin, plastic, ceramic, metal, graphite, polymer, or any other material now known or later developed. Flexible base member 210 may also be elastic. Flexible base member 210 may have a high friction component on at least a portion of at least one of first surface 215 or second surface 217 to prevent cylindrical object 6 from sliding with respect to support system 202 or to prevent support system 202 from sliding with respect to a surface 230 adjacent to surface 217 of flexible base member 210 opposite cylindrical object 6. In order to support cylindrical object 6, portions of base member 210 near at least one of first edge 242 and second edge 244 may be folded (or rolled) in such a way as to couple first surface 217 of flexible base member to second surface 215 of flexible base member 210 using coupling member 240 to form a support 246. Support 246 may be roughly circular as illustrated in FIG. 6 or may be roughly triangular, rectangular, ovoid, or any other shape suitable for forming a support. At least one living hinge (not shown) may be used to fold flexible base member 210. Coupling member 240 may initially be coupled to second surface 215 or first surface 217 of flexible base member 210 or both and may cover all or any portion of second surface 215 or first surface 217 of flexible base member 210. Conversely, coupling member 240 may be able to be separated entirely from flexible base member 210 and be coupled to second surface 215 or first surface 217 of flexible base member 210 or both only when needed. Coupling member 240 may comprise glue, tape, weld, magnet, snap, buckle, hook and loop, VELCRO™, or any other coupling mechanism now known or later developed in the art. This embodiment may be used to form supports for cylindrical object 6 of varying sizes by folding flexible base member 210 near at least one of first edge 242 and second edge 244 to vary the size of support 246 in such a way as to tailor an area 248 between supports 246 to match the size of cylindrical object 6.

Figure 7:
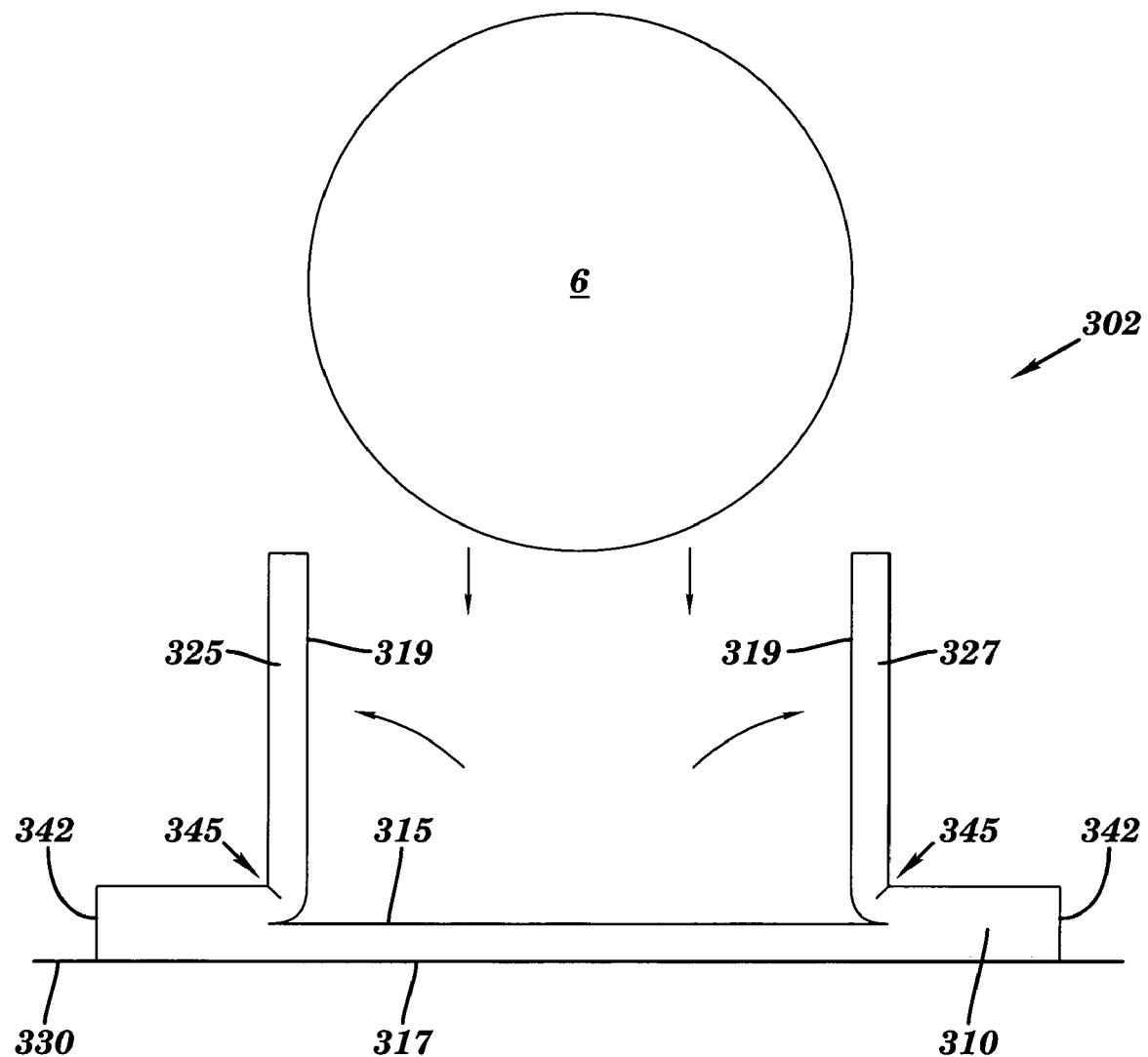
FIG. 7 shows a perspective view of a base for supporting a cylindrical object using flaps.

FIG. 7 shows a perspective view of another embodiment of a support system 302. In this embodiment, support system 302 has a flexible base member 310. Flexible base member 310 has a first flap 325 and a second flap 327. Flexible base member 310 may be rectangular, circular, ovoid, polygonal, asymmetrical, or any other shape. Flexible base member 310 may be made of rubber, cloth, animal skin, plastic, ceramic, metal, graphite, polymer, or any other material now known or later developed. Flexible base member 310 may also be elastic. Flexible base member 310 may have a high friction component to at least a portion of at least one of a first surface 315 adjacent to cylindrical object 6, a second surface 317 opposing cylindrical object 6, and a flap surface 319 to prevent cylindrical object 6 from sliding with respect to support system 302 or to prevent support system 302 from sliding with respect to a surface 330 adjacent to surface 317 of flexible base member 310 opposite cylindrical object 6. In order to support cylindrical object 6, at least one of first flap 325 and second flap 327 folds from a central region toward an outside edge 342 to create a support. At least one living hinge 345 may be used to fold at least one of first flap 325 and second flap 327 with respect to flexible base member 310 from a central portion of flexible base member 310 toward outside edge 342. A living hinge such as living hinge 345 is well known in the art as a thin section of a material, usually plastic, that connects two segments of a part to keep them together and allow the part to be opened and closed. In this illustrative embodiment, the living hinge may be integrated into the material that forms base 310. First flap 325 and second flap 327 can also be closed to form a flat surface.

Figure 8:
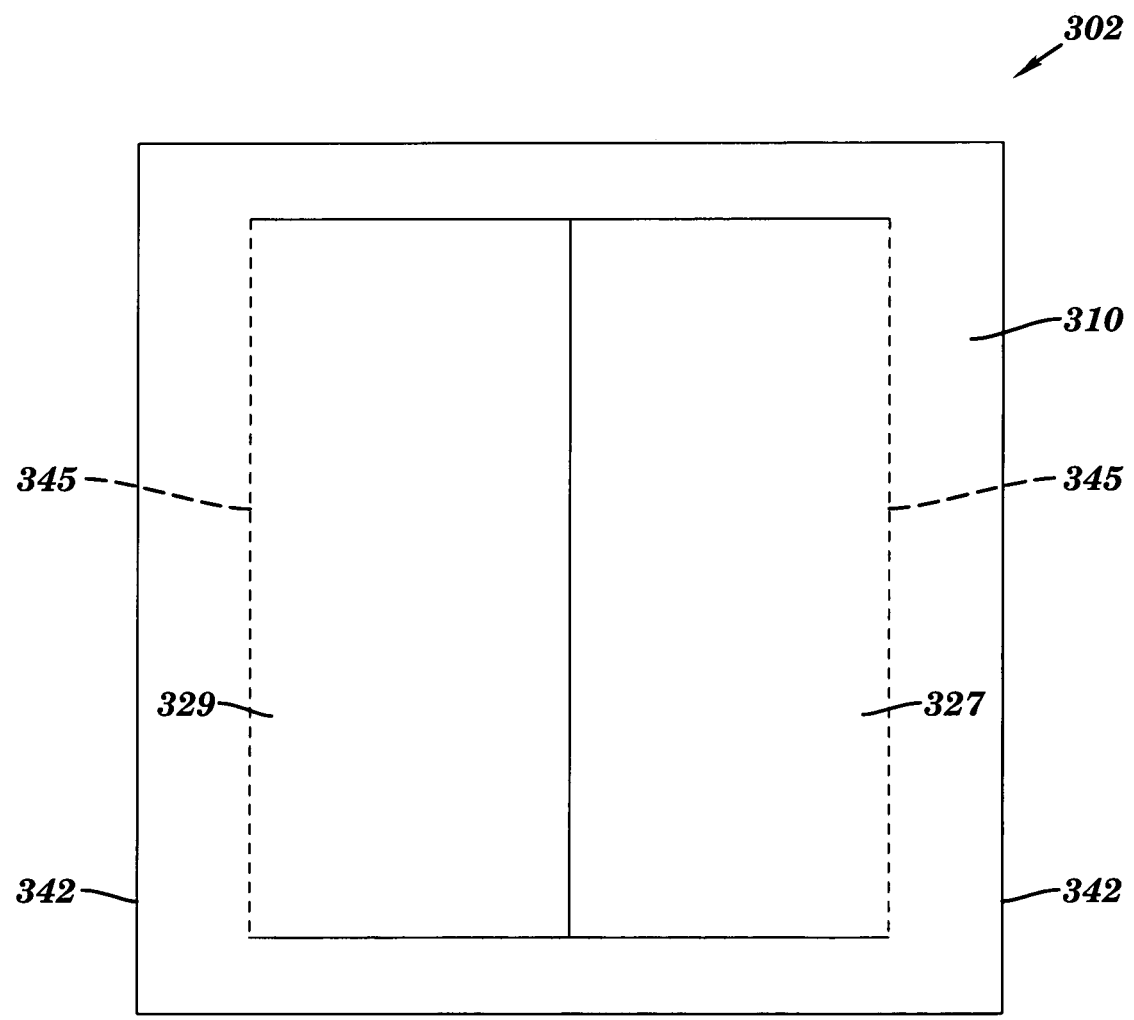
FIG. 8 shows a top-down view of the base of FIG. 7.

FIG. 8 shows a top-down view of the base of FIG. 7.

Figure 9:
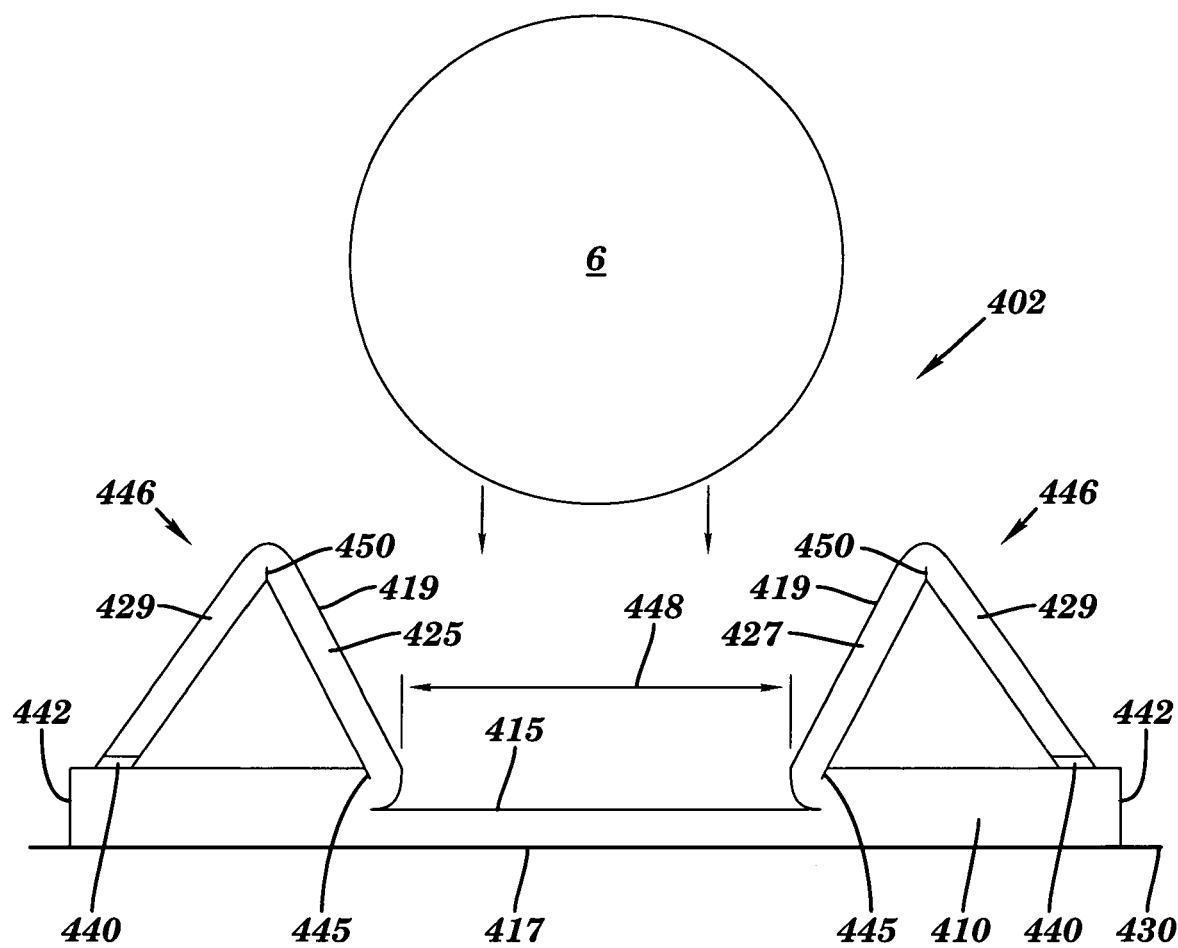
FIG. 9 shows a perspective view of a base coupled to itself to form supports for a cylindrical object.

FIG. 9 shows a perspective view of an alternative embodiment of a support system 402. In this embodiment, support system 402 has a flexible base member 410. Flexible base member 410 has a first flap 425 and a second flap 427 that fold from a central portion of flexible base member 410 toward an outside edge 442 using a living hinge 445. Flexible base member 410 may be rectangular, circular, ovoid, polygonal, asymmetrical, or any other shape. Flexible base member 410 may be made of rubber, cloth, animal skin, plastic, ceramic, metal, graphite, polymer, or any other material now known or later developed. Flexible base member 410 may also be elastic. Flexible base member 410 may have a high friction component to at least a portion of at least one of a first surface 415 adjacent to cylindrical object 6, a second surface 417 opposing cylindrical object 6, and a flap surface 419 to prevent cylindrical object 6 from sliding with respect to support system 402 or to prevent support system 402 from sliding with respect to a surface 430 adjacent to surface 417 of flexible base member 410 opposite cylindrical object 6.

Either or both of first flap 425 and second flap 427 may have an outer portion 429 that pivots at a second living hinge 450. In order to support cylindrical object 6, at least one of first flap 425 and second flap 427 folds from a central region toward an outside edge 442 and secondary flap 429 folds to abut flexible base member 410 to create a support 446. Support 446 may be roughly triangular as illustrated in FIG. 9 or may be roughly circular, rectangular, ovoid, or any other shape suitable for forming a support. A coupling member 440 may be used to couple outer portion 429 of the flap and flexible base member 410. Coupling member 440 may initially be coupled to outer portion 429 or flexible base member 410 or both and may cover all or any portion of outer portion 429 or flexible base member 410. Conversely, coupling member 440 may be able to be separated entirely from outer portion 429 and flexible base member 410 and be coupled to outer portion 429, flexible base member 410, or both only when needed. Coupling member 440 may comprise glue, tape, weld, magnet, snap, buckle, hook and loop, VELCRO™, or any other coupling mechanism now known or later developed in the art. This embodiment may be adapted to cylindrical object 6 of varying sizes by folding at least one of first flap 425 and second flap 427 to vary the size of support 446 in such a way as to tailor an area 448 between supports 446 to match the size of cylindrical object 6.

Another embodiment of the invention comprises the combination of support system 2, 102, or 202 as shown in FIGS. 1–9 and cylindrical object 6 as described above.

While this invention has been described in conjunction with the specific embodiments outlined above, it is evident that many alternatives, modifications and variations will be apparent to those skilled in the art. Accordingly, the embodiments of the invention as set forth above are intended to be illustrative, not limiting. Various changes may be made without departing from the spirit and scope of the invention as defined in the following claims.

What is claimed is:

1. A support system for supporting a cylindrical object with a longitudinal axis extending in a generally horizontal direction, the support system comprising:
    a plurality of unconnected opposed feet, each foot having:
        a first side curved to conform to a curved exterior of the cylindrical object,
        wherein the first side includes an adhesive; and
    a foot base;
    wherein the first side of at least one of the feet abuts the cylindrical object on each side of a vertical plane containing the longitudinal axis of the cylindrical object.

2. The support system of claim 1, further comprising a foot base pad coupled to the foot base wherein at least a portion of a foot base pad is made of a high friction substance.

3. The support system of claim 1, wherein the plurality of unconnected opposed feet includes four unconnected opposed feet.

* * * * *